(12) United States Patent
Gottfried-Gottfried et al.

(10) Patent No.: US 6,259,550 B1
(45) Date of Patent: Jul. 10, 2001

(54) PHASE-MODULATING MICROSTRUCTURES FOR HIGHLY INTEGRATED SURFACE LIGHT MODULATORS

(75) Inventors: Ralf Gottfried-Gottfried, Dresden; Heinz Kück, Langebrück; Detlef Kunze, Dresden, all of (DE)

(73) Assignee: Fraunhofer-Gesellschaft zur Forderung der Angewandten Forschung E.V., Munich (DE)

( * ) Notice: Subject to any disclaimer, the term of this patent is extended or adjusted under 35 U.S.C. 154(b) by 0 days.

(21) Appl. No.: 09/202,694
(22) PCT Filed: Jun. 17, 1997
(86) PCT No.: PCT/EP97/03149
§ 371 Date: Aug. 20, 1999
§ 102(e) Date: Aug. 20, 1999
(87) PCT Pub. No.: WO97/49000
PCT Pub. Date: Dec. 24, 1997

(30) Foreign Application Priority Data

Jun. 18, 1996 (DE) .............................. 196 24 276

(51) Int. Cl.⁷ .................................................. G02B 26/00
(52) U.S. Cl. ........................ 359/279; 359/290; 359/291
(58) Field of Search .................... 359/224, 279, 359/290, 291, 295

(56) References Cited

U.S. PATENT DOCUMENTS

| | | | |
|---|---|---|---|
| 3,560,955 | 2/1971 | Hallman et al. | 340/324 |
| 3,835,346 * | 9/1974 | Mast et al. | 313/394 |
| 4,660,938 | 4/1987 | Kazan | 350/355 |
| 5,521,747 * | 5/1996 | Engle | 359/292 |
| 5,903,323 * | 5/1999 | Ernstoff et al. | 348/771 |
| 5,933,183 * | 8/1999 | Enomoto et al. | 347/241 |
| 6,057,897 * | 5/2000 | Ichikawa et al. | 349/48 |

FOREIGN PATENT DOCUMENTS

| | | |
|---|---|---|
| 1 291 416 | 3/1969 | (DE) . |
| 1 596 649 | 8/1981 | (GB) . |
| 4-350819 | 12/1992 | (JP) . |

* cited by examiner

*Primary Examiner*—Georgia Epps
*Assistant Examiner*—Timothy Thompson
(74) *Attorney, Agent, or Firm*—Michael A. Glenn

(57) ABSTRACT

A structure for the phase modulation of light (32) incident upon said structure comprises a mirror (40), a deformable and transparent dielectric (36) disposed on the mirror (40), at least two electrodes (41; 42; 41a, 41b, 42; 50, 50') having one or several fixed potentials and being adapted to have one or more control voltages applied thereto for generating an electric field (58) in at least a partial region of said dielectric (36), thereby changing the optical path length of the light passing through said dielectric (36) with respect to a state of the dielectric (36) in which the electric field is not applied thereto. An arrangement of a plurality of such phase-modulating structures applied on a CMOS active matrix constitutes a very large scale integrated spatial light modulator.

30 Claims, 13 Drawing Sheets

PHASE-MODULATING MICROSTRUCTURES FOR HIGHLY INTEGRATED SURFACE LIGHT MODULATORS

The present invention relates to very large scale integrated spatial light modulators for light valves, and in particular to phase-modulating structures for the phase-modulation of light incident upon the structures.

Spatial light modulators, which are employed for light valves, have been in use for some time in connection with so-called schlieren imaging systems for applications in projectors or in the direct exposure of semiconductor wafers. Electronic image information is converted to corresponding phase modulations of a ray of light, which are produced by means of the spatial light modulators. The schlieren imaging system then converts the phase modulations of the ray of light into light intensity variations on an observation plane, for example, by blocking the non-modulated light and allowing passage of the light incident on modulated portions of the spatial light modulator. The mode in which the modulated light reaches the observation plane is referred to as positive mode. When the schlieren imaging system is arranged such that only the non-modulated light reaches the observation plane and the modulated light is blocked, the entire exposure arrangement operates in the so-called negative mode.

For better understanding of the field of application of the present invention, a schlieren imaging system, making use of a known spatial light modulator, shall be discussed briefly in the following. This known exposure means is disclosed in WO 91/17483.

A light source, which often is in the form of a laser, transmits light via a ray expansion optical system and a focusing optical system to a bar mirror arrangement reflecting the light through a schlieren lens means onto a spatial light modulator. Depending on whether or not a picture element of the spatial light modulator is addressed, light reflected from the spatial light modulator is either reflected through the schlieren lens means onto the bar mirror arrangement again, or the light passes the same and reaches a projection lens means which then forms an image of this light on an observation plane. In this observation plane there may be disposed, for example, a wafer to be exposed.

As was already noted hereinbefore, the entire schlieren imaging system can form an image of that light on the observation plane that was modulated by the spatial light modulator, i.e. corresponding to the positive mode, or the optical system can form an image of that light on the observation plane that was not modulated by the spatial light modulator, which corresponds to the negative mode, with the modulated light being blocked by the observation plane and reflected back to the light source, for example.

DESCRIPTION OF THE PRIOR ART

The exposure device described in WO 91/17483 makes use of a spatial light modulator comprising a viscoelastic control layer terminating, in the direction towards the schlieren lens means, by a reflecting surface that may be a metal film, for example. The spatial light modulator furthermore comprises a so-called active addressing matrix that may be formed of a monolithic integrated arrangement of MOS transistors, which is also referred to as active CMOS matrix, having associated control electrode pairs. Each picture element or surface portion of the reflecting surface of the light modulator has associated therewith two transistors having one or more electrode pairs, which each form a diffraction grating with one or more grating periods with the viscoelastic layer and its reflecting surface.

As described in the article entitled "Deformation behavior of thin viscoelastic layers used in active-matrix-addressed spatial light modulator, SPIE, vol. 1018, Electro-Optic and Magneto-Optic Materials" (1988), voltages of at least about ±10 volt are necessary for deformation amplitudes of the visco-elastic control layer in the range of 0.1 $\mu$m. The transistors of the active matrix thus have to withstand at least a peak-to-peak voltage of 20 V or more. Many conventional MOS components, however, have a maximum operating voltage of only 12 V. It is therefore not possible to use for such light modulators conventional, inexpensive CMOS components. Instead, known light modulators having a viscoelastic layer require specifically doped transistors for obtaining sufficient breakdown voltages.

U.S. Pat. No. 4,728,185 discloses a spatial light modulator the reflecting surface of which consists of a multiplicity of electrically addressable, micromechanical lever bars.

The document JP-A-4 350 819 discloses a variable-phase plate producing a phase difference with good reproducibility and good controllability. The variable-phase plate comprises an inner dielectric in the form of a layer, which is mounted in a correspondingly sized hole in an outer dielectric by means of an elastic material. Both major surfaces of the inner dielectric are coated with a first and a second electrode, respectively, and the two major surfaces of the outer dielectric are also coated with a first and a second electrode, respectively. The electrodes are light-transmitting conductor layers to which a potential can be applied each. When a specific differential voltage is applied to the electrodes mounted on the surfaces of the inner dielectric, the thickness of the inner dielectric is changed. When no or a different voltage difference is applied to the electrodes mounted on the surfaces of the outer dielectric, the phase of the light passing through the inner dielectric will be different from the phase of the light passing through the outer dielectric. The elastic material connecting the inner dielectric to the outer dielectric has the function of permitting different thicknesses of the inner dielectric and the outer dielectric.

DE-AS 12 91 416, on which the generic clause of patent claim 1 is based, teaches an optical phase modulator comprising a first, reflecting electrode applied to a registration strip. Disposed above the first electrode is a piezoelectric layer having a second, transparent electrode on its surface facing away from the first electrode, with said second electrode in turn being covered by a transparent substrate in the direction towards light incidence. By applying a voltage to different parts of the first electrode by means of the registration strip, the thicknesses of the portions of the piezoelectric layer are altered in corresponding manner. Light passing through a portion of the piezoelectric layer in which a voltage is applied, and reflected from the first electrode and passing back through said portion of the piezoelectric layer, has a phase difference from light passing through a different portion of the piezoelectric layer to which a different voltage is applied, and reflected from the first electrode and passing back through said different portion of the piezoelectric layer, since the thicknesses of the portions of the piezoelectric layer having different voltages applied thereto are different from each other.

U.S. Pat. No. 4,660,938 discloses a light valve having a fine diffraction grating formed on a transparent electrode, with the depth of grooves of the diffraction grating being such that the optical path length of light of a specific wavelength, which passes between the spaces between the individual diffraction grating bars, constitutes an odd-number difference with respect to half the wavelength of the light passing through the diffracting grating. Opposite the transparent electrode, there is disposed an additional transparent electrode, and in the space between the two electrode there are both air and a transparent liquid. When a voltage is applied to the two electrodes, an electric field is generated attracting the liquid into the spaces between the diffraction grating bars, thereby changing the optical path length of light passing through these spaces. Since the initial difference of the optical path length between light passing through the diffraction grating bars and light passing through the spaces therebetween is altered, there is no longer a cancellation of adjacent light rays, so that light can pass through the diffracting grating structure. The light valve thus will transmit substantially no light when no voltage is applied, whereas when a voltage is applied, light is transmitted through the structure due to the liquid being now arranged in a different manner.

U.S. Pat. No. 3,560,955 discloses an optical element having a layer of an isotropic transparent material capable of displaying birefringence when subjected to a load. The load may be established by a plurality of load-producing elements distributed on the layer substantially in uniform manner, with the load-producing elements, which may comprise electro-strictive and magnetostrictive materials, being effectively connected to a means for controllably applying predetermined amounts of loads to the layer. The transparent isotropic material displaying a birefringence property under load conditions is disposed between a polarization screen and an analysis screen. Disposed also between the polarization screen and the analysis screen as well as adjacent the isotropic material, is an electrostrictive converter bar 18 of which two sides are coated with a current-conducting thin metal coating constituting electrodes to which a voltage may be applied in order to deform the electrostrictive converter bar, so as to be able to exert a load on the isotropic material and cause the same to become birefringent. When the isotropic material becomes birefringent, the color of light transmitted through the analysis screen can be changed.

GB 15 96 649 teaches a means for optical phase modulation. This means comprises a quartz crystal having two light-transmitting end sections through which the light rays pass. On the quartz crystal, there are provided two pairs of electrodes beside the end sections thereof. When suitable voltages are applied to the electrodes, an oscillation of the quartz crystal is obtained, bending the latter, so as to subject light rays passing through the ends thereof to phase modulation.

SUMMARY OF THE INVENTION

It is the object of the present invention to provide other phase-modulating structures for the phase-modulation of light as well as spatial light modulators composed thereof.

In accordance with a first aspect of the present invention, this object is met by a structure for the phase modulation of light incident upon said structure, comprising a mirror; a deformable and transparent dielectric disposed on the mirror; and at least two electrodes adapted to have a voltage applied thereto for generating an electric field in at least a partial region of said dielectric, thereby changing the optical path length of the light passing through the dielectric with respect to a state of the dielectric in which the electric field is not applied thereto, wherein said dielectric with respect to the electrodes is disposed such that the light passing through the dielectric passes at least through part of said partial region of the dielectric adapted to have the electric field applied thereto, before it impinges upon one of the electrodes, and where said dielectric, said mirror and said electrodes are arranged on a substrate having a CMOS active matrix through which a voltage can be applied to said electrodes.

In accordance with a second aspect of the present invention, this object is met by a spatial light modulator, comprising a plurality of like or different structures arranged in an array, each structure comprising a mirror; a deformable and transparent dielectric disposed on the mirror; and at least two electrodes adapted to have a voltage applied thereto for generating an electric field in at least a partial region of said dielectric, thereby changing the optical path length of the light passing through the dielectric with respect to a state of the dielectric in which the electric field is not applied thereto, wherein said dielectric with respect to the electrodes is disposed such that the light passing through the dielectric passes at least through part of said partial region of the dielectric adapted to have the electric field applied thereto, before it impinges upon one of the electrodes, and wherein said dielectric, said mirror and said electrodes are arranged on a substrate having a CMOS active matrix through which a voltage can be applied to said electrodes.

The invention utilizes the effect that a dielectric is drawn into the field area of a capacitor arrangement having a voltage applied thereto, until the capacitance has reached a maximum or the volume of air of the capacitor is filled with the dielectric, respectively, as will be described in more detail hereinafter with reference to FIGS. 1a and 1b.

In particular by using a liquid dielectric on a mirror, sufficient phase modulations of light incident on the phase-modulating structure according to the invention can be produced with small voltages, whereby it becomes possible to control the spatial light modulator making use of the phase-modulating structure according to the invention, with the aid of a active CMOS matrix. CMOS components are inexpensive, display very low power consumption and can be produced in very large scale integration.

Another advantage of the present invention consists in that the voltages required for producing a specific phase modulation, with structures of decreasing size, also become smaller, so that, for example, thermal power dissertations is in very large scale integrated light valves according to the present invention are small and so that, with smaller structures, it is also possible at the same time to use smaller transistors for controlling the smaller voltages. This means that the structures according to the invention have a beneficial scaling behavior.

Phase-modulating structures according to the present invention in conjunction with an active CMOS matrix, furthermore, permit extensive miniaturization of the spatial light modulator, so that the minutest picture element areas along with at the same time extremely high picture element numbers ($10^6$ to $10^9$) are possible. The phase modulations obtainable of the light through the picture elements are preferably in the range from zero to Π, however with larger phase modulations being possible as well.

The miniaturization of the spatial light modulators is advantageous in particular in that, for example, in the direct exposure of semiconductor wafers, complex and high-loss optical arrangements with strong reduction can be dispensed with since the dimensions of the achievable spatial light modulators can already be brought into the order of magnitudes, for example, of a wafer to be exposed.

BRIEF DESCRIPTION OF THE DRAWINGS

In the following, preferred embodiments of the present invention will be elucidated in more detail way of the accompanying drawings in which.

DETAILED DESCRIPTION OF PREFERRED EMBODIMENTS OF THE INVENTION

The present invention is based on the effect that a dielectric is attracted into the field area of a capacitor arrangement until the capacitance has reached a maximum or until the volume of air of the capacitor is filled with the dielectric to the largest possible extent. This shall be elucidated now by way of the simple arrangement shown in FIGS. 1a and 1b.

Figure 1A:
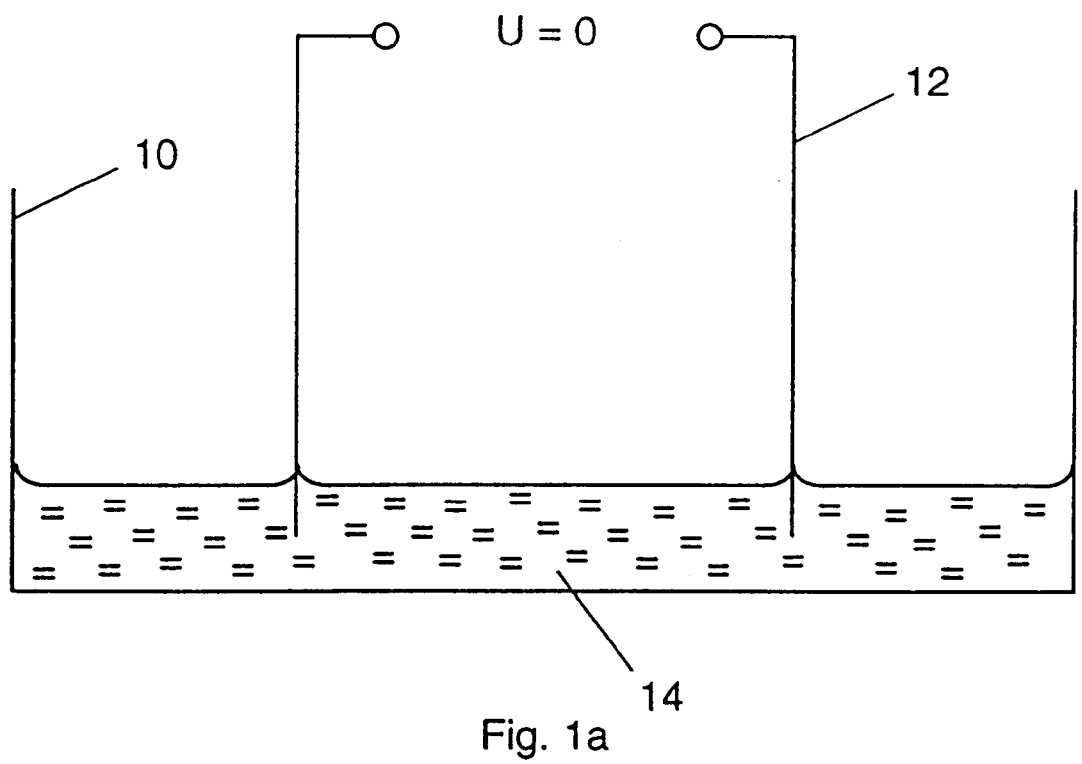
FIGS. 1a and 1b are graphical representations of the effect underlying the phase-modulating structure according to the present invention.
Figure 1B:
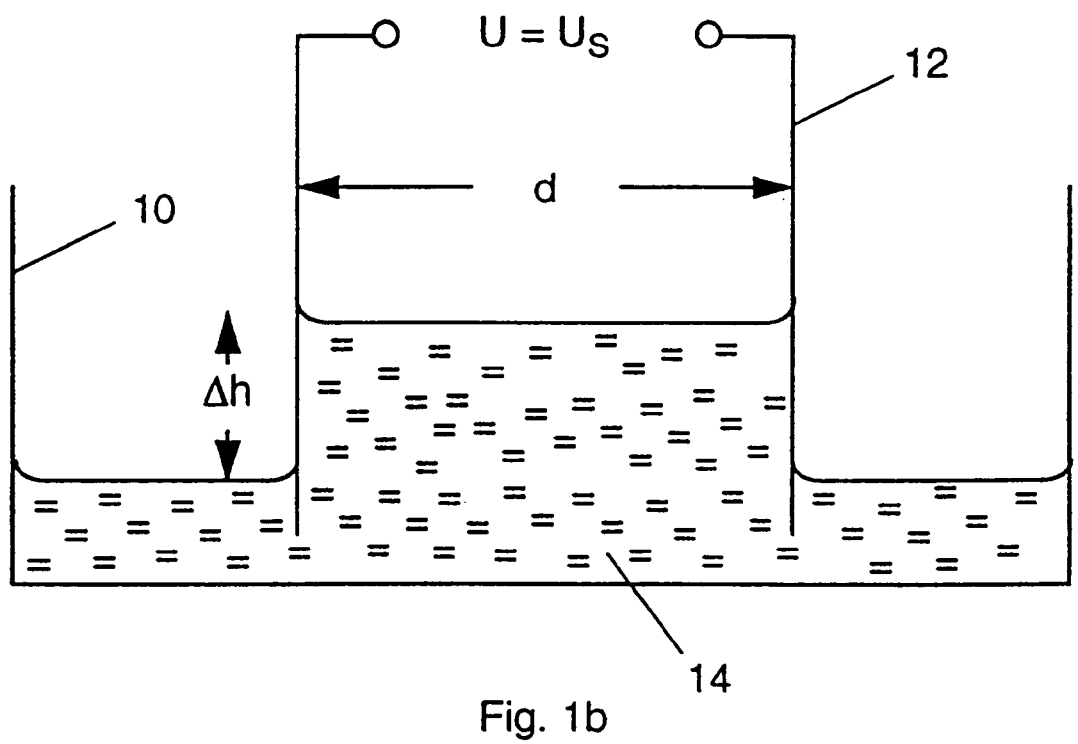

FIGS. 1a and 1b show a container 10 and a plate capacitor 12. The distance between the two plates of the plate capacitor is designated d. In FIG. 1a, no voltage is applied to the plate capacitor (U=0). A liquid dielectric 14 present in the container has the same liquid level between the plates of the plate capacitor and outside the plates of the plate capacitor. Only directly at the two plates of the plate capacitor and at the container wall, the level of the liquid dielectric 14 is slightly raised due to the surface tension and the capillarity of the liquid.

When a control voltage $U_S$ is applied to the electrodes of plate capacitor 12, the liquid level between the capacitor plates, due to the effect mentioned, rises against gravity above the level established due to capillarity (FIG. 1a). The difference in liquid level between the case in which the voltage applied is 0 and the case in which the voltage applied is $U_S$, is designated Δh. It is to be noted that this effect does not only occur with a liquid dielectric, but the dielectric, for example, may also be a solid or a gas.

The following example shall give an idea the orders of magnitude involved by way of numerical values. For example, when silicone oil is used as suitable liquid dielectric 14, having a density of about 1 g/cm$^3$ and a dielectric constant $\epsilon_r$ of about 2.5, the liquid level between the capacitor plates rises by about 1 μm when the plate distance of the plate capacitor is 25 μm and when a voltage of 1 V is applied to the plates of the plate capacitor. Expressed in general terms, the liquid level difference is proportional to $U^2/d^2$, d being the distance between the plates and U being the voltage at the plate capacitor.

Figure 2:
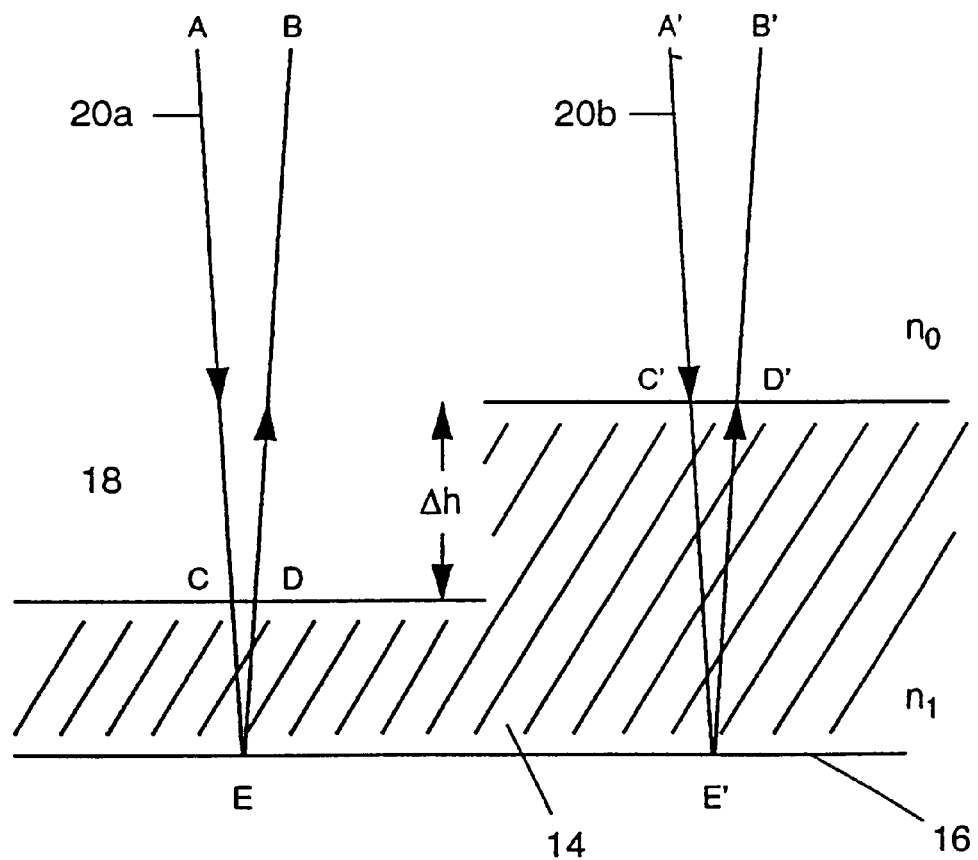
FIG. 2 shows a view illustrating the creation of phase modulation of the light in case of perpendicular incidence of light.

FIG. 2 shows the manner in which a phase modulation of light is established due to a level change of the liquid dielectric 14. In FIG. 2, a mirror 16 is provided underneath the liquid dielectric 14 having a refractive index $n_1$. Above liquid dielectric 14, there is provided a different dielectric 18 having a refractive index $n_0$, which may be air for example. The left-hand half in FIG. 2 corresponds to FIG. 1a, i.e. there is no dielectric field present in liquid dielectric 14. The right-hand half in FIG. 2 corresponds to FIG. 1b, i.e. the level of liquid dielectric 14 is raised due to an electric field present in liquid dielectric 14.

Two rays of light 20a and 20b, respectively, impinging in about perpendicular manner will be compared, which propagate in portions with different liquid levels and which are reflected on mirror 16 at a point E and E', respectively, and then continue back again through the dielectrics with refractive indices $n_1$ and $n_0$. On their way from A to B and A' to B', respectively, the two rays follow different optical paths due to the level difference Δh. This difference of the optical paths manifests itself in a phase difference of the two light rays 20a and 20b, as follows:

$$\Delta\Phi = 4\Pi \cdot (n_0 - n_1) \cdot \Delta h / \lambda$$

In this equation, λ represents the wavelength of the incident light. With a liquid having $n_1$=1.4 (for example silicone oil), a level difference of Δh=λ/1.6 is required for a phase modulation of Π, i.e. λ/2. In other words, an electric field present in liquid dielectric 14 extends the optical path of a ray of light due to the effect described hereinbefore. It is thus possible with an arrangement according to FIGS. 1a and 1b to modulate the phase of incident light in response to an electric voltage.

Figure 3:
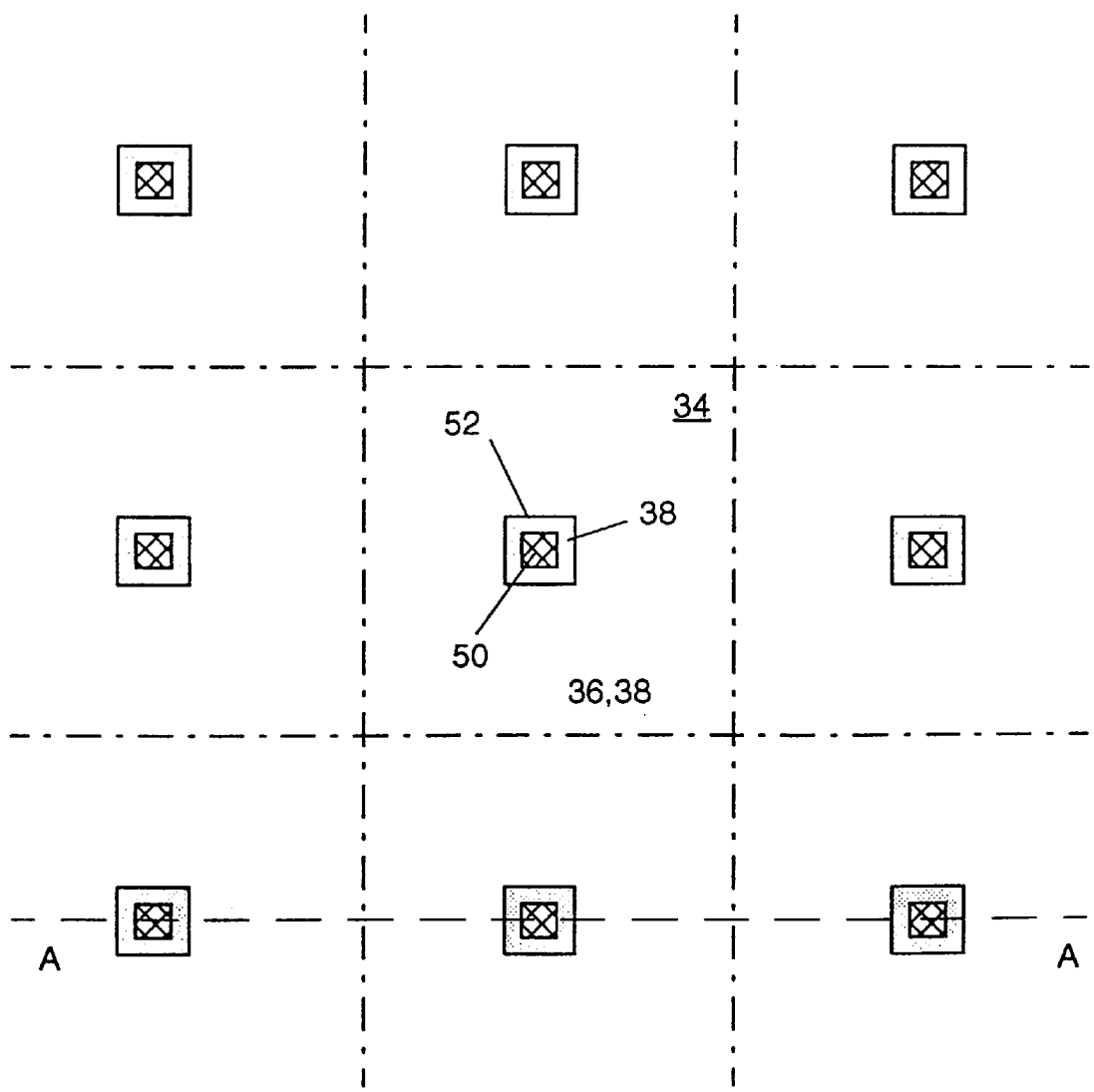
FIG. 3 shows a plan view of an array of phase-modulating structures according to a first embodiment of the present invention.
Figure 4:
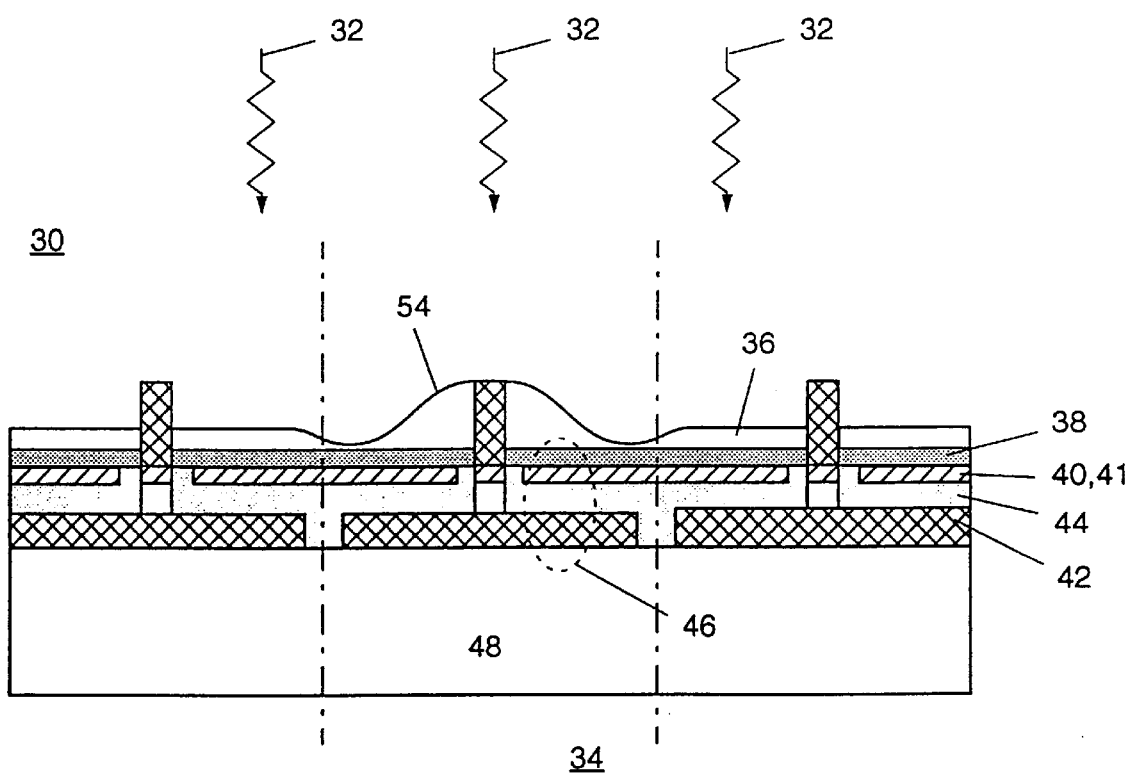
FIG. 4 shows a sectional view of the array of phase-modulating structures of FIG. 3.

FIG. 3 shows a spatial light modulator 30 according to a first embodiment of the present invention in a top plan view, whereas FIG. 4 shows this spatial light modulator 30 in a cross-section along the lines A—A in FIG. 3. The term "top plan view" and the term "top", respectively, in the present application merely refer to the direction from which light impinges on a spatial light modulator 30. In the top plan view of FIG. 3, the light thus impinges from above on the drawing plane. The top side of the structure 30 is the side on which the incident light 32 impinges.

As shown in FIG. 3 and FIG. 4, which is a cross-section along the lines A—A of FIG. 3, spatial light modulator 30 consists of a plurality of phase-modulating structures 34 each defining individual picture elements of spatial light modulator 30. The outlines of the individual phase-modulating structures 34 are shown in FIG. 3 schematically by the dot-and-dash lines. These dot-and-dash lines are of no relevance for the construction of spatial light modulator 30, but merely serve to illustrate the phase-modulating structures 34.

An individual phase-modulating structure 34 will be described in the following by way of FIG. 4. Incident light 32 first impinges on a liquid dielectric 36. This liquid dielectric 36 is located on a thin dielectric layer 38 arranged on a mirror 40. In this embodiment of the present invention, the mirror 40 as well as an electrode 41, which is also referred to as mirror electrode, are formed in integral manner, with the mirror 40 being realized by a suitable surface of electrode 41. However, mirror 40 and electrode 41 could also be separate elements.

Between mirror electrode 41 and a metallic electrode 42, which is also referred to a control electrode, there is provided a solid dielectric 44, with control electrode 42, mirror electrode 41 and solid dielectric 44 constituting a buffer capacitor 46 whose capacitance per unit length can be adjusted via the thickness and the dielectric constant of the fixed dielectric 44.

Control electrode 42 is provided on a substrate 48 which may be designed as CMOS active matrix, for example, and which is capable of addressing the control electrodes 42 of spatial light modulator 30, which is constituted by an array of phase-modulating structures 34, with the necessary control voltages in optional manner and with sufficient resolution.

The substantially square control electrode, whose edges extend slightly beside the dot-and-dash lines of phase-modulating structure 34 (FIG. 3), has in its center a pin 50 of tungsten or a different suitable, electrically conducting material or a combination of materials. Pin 50 extends through a hole 52 in mirror electrode 41 and mirror 40. Hole 52 is shown in FIG. 3 in substantially square form, but it is obvious that it may also be circular or may assume any other suitable shape. Pin 50 which extends through hole 52 and is in electrically conducting connection with control electrode 42, is electrically isolated from mirror electrode 41 by the solid dielectric 44 and the thin dielectric layer 38.

Due to the planarized dielectric 44 and the metal layer deposited thereon and constituting mirror electrode 41, a mirror plane of high planarity and good reflectivity has been realized. As has already been pointed out, the thin dielectric layer 38 isolates control electrode 42, i.e. pin 50, from mirror electrode 41, and it provides, for example, for good wetting of the area of mirror electrode 40 opposite control electrode 42 and for chemical separation of the mirror from the liquid dielectric, so as to improve the corrosion resistance of the arrangement. Control electrode 42 may also be coated with a dielectric.

Liquid dielectric 36 is located in the space above thin dielectric layer 38. Via the surface tension of the liquid dielectric 36, its density and its wetting properties in relation to the system formed of mirror 40, mirror electrode 41, thin dielectric layer 38, and control electrode 42, i.e. pin 50, and by means of a possible passivation, the shape of the surface profile of liquid dielectric 36 can be adjusted or optimized. The optically ideal state of the liquid dielectric is marked by uniform covering of the area of mirror 40 with a homogenous level of liquid dielectric 36 when no voltage is applied to phase-modulating structure 34. Dielectric layer 38 is not required on principle for functioning and isolation. However, it can be utilized to advantage for optimizing wetting with the liquid and thus for optimizing the surface of the liquid film.

In the following, the mode of operation of spatial light modulator 30 according to a first embodiment of the present invention will be elucidated in more detail by way of the mode of operation of phase-modulating structure 34. Mirror electrode 41 is preferably at a fixed potential, such as e.g. ground potential. When a voltage $U_S$ is applied to control electrode 42 by means of the CMOS active matrix, which constitutes the substrate 48 of phase-modulating structure 34, the liquid dielectric 36 is drawn into the air-filled field portion of the capacitor formed of control electrode 42, i.e. pin 50, and mirror electrode 41.

FIG. 4 shows phase-modulating structure 34 in the addressed state, i.e. when a voltage $U_S$ is applied to control electrode 42. In contrast to the liquid profile of the two phase-modulating structures shown in the non-addressed state to the very left and right in FIG. 4, phase-modulating structure 34 displays an altered liquid profile 54. Liquid dielectric 36 is deposited on pin 50, whereby the liquid profile 54 remoter from pin 50 shows a reduction in liquid level as compared to the non-addressed state. It should be noted that all individual phase-modulating structures can be addressed independently of each other, and the individual operating parameters, such as e.g. the level of liquid dielectric 36 and the area of a phase-modulating structure, can be selected such that adjacent phase-modulating structures substantially do not affect each other.

The light 32 incident on the addressed phase-modulating structure 34, due to the level difference of the liquid dielectric or the liquid profile 54 of an addressed structure, obtains a phase shift with respect to the light incident upon a non-addressed phase-modulating structure. Upon deactivation of the voltage $U_S$ applied to control electrode 42, i.e. upon discharging of the capacitor, the liquid dielectric 36 is reset under the influence of gravity, so that a substantially level liquid profile is restored.

The embodiment of the present invention as shown in FIGS. 3 and 4, distinguishes itself by a high optical filling or occupancy level. The occupancy level reflects the ratio of the optically active area of a picture element to the overall area of the same. It is to be pointed out in this context that FIG. 3 and FIG. 4 are not drawn to scale, but that the holes 52 through the mirror electrode are considerably enlarged as compared to the size of a picture element. In a preferred embodiment, the area of a picture element is $10 \times 10\,\mu m^2$, the diameter of pin 50 is $0.8\,\mu m$ and the diameter of circular hole 52 is $1.6\,\mu m$. With this embodiment of the present invention, an occupancy level of 98% is obtained, for example. In another embodiment of the present invention, using a smaller picture area of $3 \times 3\,\mu m^2$, a diameter of pin 50 of $0.5\,\mu m$ and a diameter of hole 52 of $1.6\,\mu m$, an optical occupancy level of 89% is obtained.

With reference to FIG. 3, showing spatial light modulator 30 according to a first preferred embodiment of the present invention in a plan view, it is to be pointed out that mirror 40 and mirror electrode 41 throughout the spatial light modulator, apart from the individual holes 52, are of continuous design. Furthermore, the entire structure of spatial light modulator 30, i.e. mirror electrode 41 coated with thin dielectric layer 38, is covered throughout by liquid dielectric 36, and only pins 50 project from the substantially planar surface of liquid dielectric 36, so to speak in the form of "islands", when spatial light modulator 30 is not driven.

Figure 5:
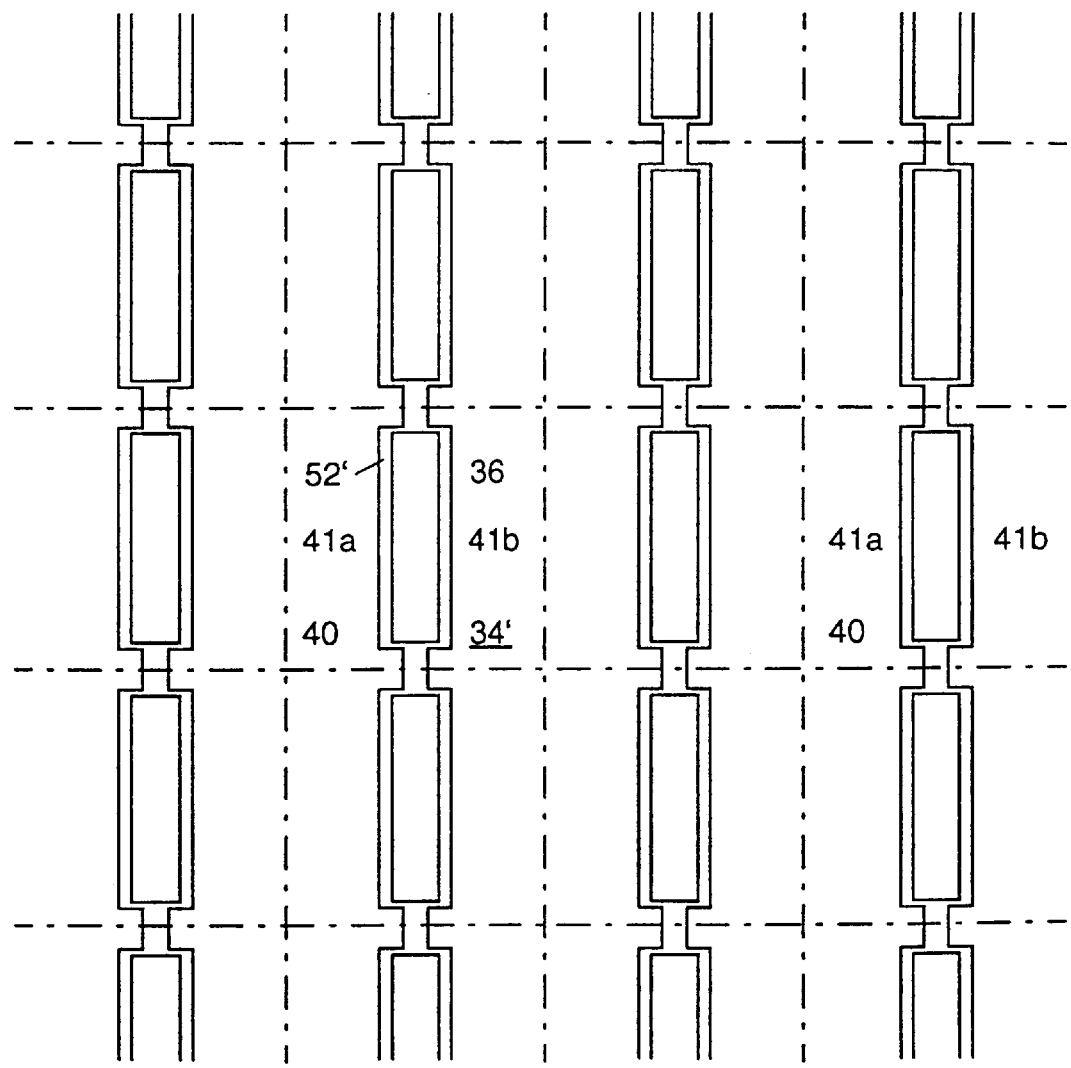
FIG. 5 shows a plan view of an array of phase-modulating structures according to a second embodiment of the present invention.
Figure 6:
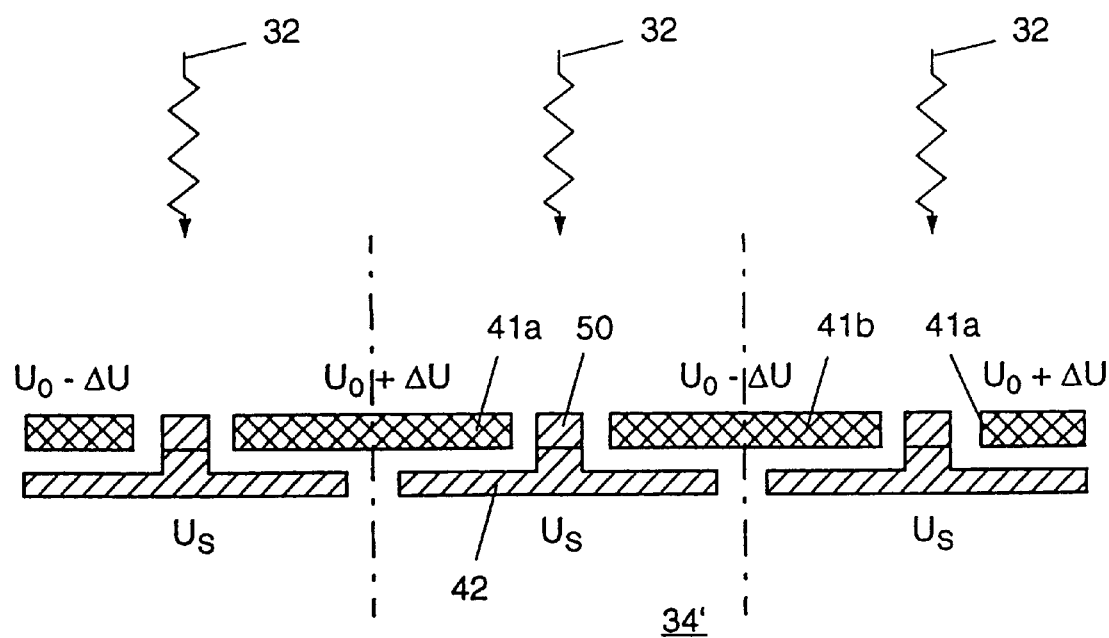
FIG. 6 shows a sectional view of the array of phase-modulating structures of FIG. 5.

FIG. 5 shows a second embodiment of the present invention in a top plan view, while FIG. 6 shows the second embodiment of the present invention in a cross-section. The second preferred embodiment of the present invention is similar to the first preferred embodiment of the present invention shown in FIGS. 3 and 4, however without the thin dielectric layer 38 and the solid dielectric 44 being present, as can be seen in particular in FIG. 6. Moreover, pins 50 do not project beyond the plane constituted by mirror electrode strips 41a, 41b, but are substantially flush therewith. As was already pointed out in the description of the first embodiment, mirror 40 is realized by the surface of mirror electrode strips 41a, 41b in this embodiment as well. However, mirror 40 can also be designed separately from mirror electrode strips 41a, 41b. Substrate 48 as well as the liquid dielectric 36, which in the second embodiment of the present invention extends also into the spaces between mirror electrode 40 and control electrode 42, are omitted in FIG. 6 for reasons of illustration only. It is pointed out that the first embodiment of the present invention may also be constituted without thin dielectric layer 38 and solid dielectric 44 and with flush pins 50, just as well as the second embodiment of the present invention may be designed with thin dielectric layer 38 and with solid dielectric 44 and with projecting pins 50.

Analogously with FIG. 3, in the spatial light modulator 56 according to the second embodiment of the present invention the individual phase-modulating structures 34' again are delimited from each other by dot-and-dash lines. A square defined by respective dot-and-dash lines constitutes a picture element. It is apparent to experts that the individual picture elements, i.e. the phase-modulating structures, need not necessarily be square, but may also assume any other shape desired.

As a difference from FIG. 3, elongate holes 52' are provided, extending longitudinally in one direction of phase-modulating structure 34', but being constricted shortly before the beginning of the next picture element. In contrast to the first embodiment of the present invention, however, hole 52' is connected to hole 52' of the adjacent phase-modulating structure, as can be seen in FIG. 5. The result hereof is that mirror electrode 41, which is of continuous design in FIG. 3, is no longer continuous in FIG. 5, but rather mirror electrode strips 41, 41b are created, with the mirror electrode strip 41a located on the left-hand side of hole 52' in FIG. 5 being electrically isolated from the mirror electrode strip 41b located on the right-hand side of hole 52'. Mirror 40 (FIG. 5), for reasons of clarity, is not indicated by its reference numeral in FIGS. 6 to 8, since it is realized by the surface of mirror electrode strips 41a and 41b.

Electronic control of the second embodiment of the present invention takes place in similar manner to electronic control of the first embodiment of the present invention. However, due to the fact that the two mirror electrode strips 41a, 41b now are electrically isolated from each other, they each have applied thereto a different, fixed or controllable voltage $U_0 + \Delta U$ and $U_0 - \Delta U$, respectively. In the example of FIG. 4, mirror electrode strip 41a has the voltage $U_0 + \Delta U$ applied thereto, whereas mirror electrode strip 41b has the voltage $U_0 - \Delta U$ applied thereto. It is, however, apparent that mirror electrode strips 41a, 41b also may have the opposite voltages applied thereto. The voltage applied to control electrode 42 provided with pin 50 flush with the plane of the mirror electrode strips, is designated $U_S$. It is obvious to experts that pin 50 may be formed integrally with control electrode 42. The voltage $U_S$ applied to control electrode 42 has a level that is between the voltage levels of mirror electrode strips 41a, 41b. Control electrode 42 consequently can be controlled with the voltage swing $2\Delta U$.

Figure 7A:
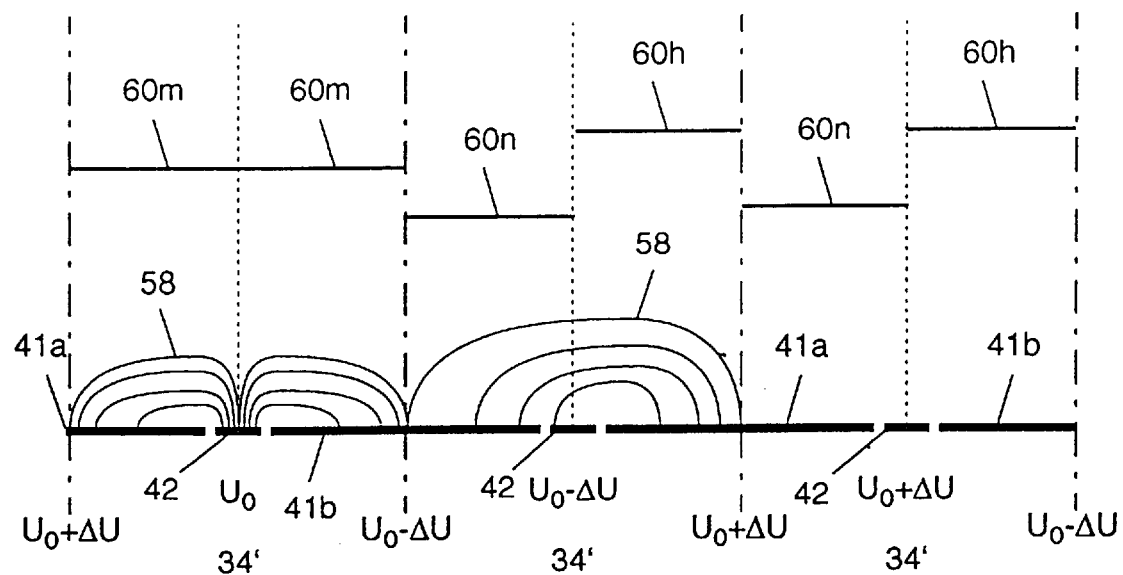
FIGS. 7a and 7b schematically illustrate the mode of operation of the array of phase-modulating structures of FIG. 5.
Figure 7B:
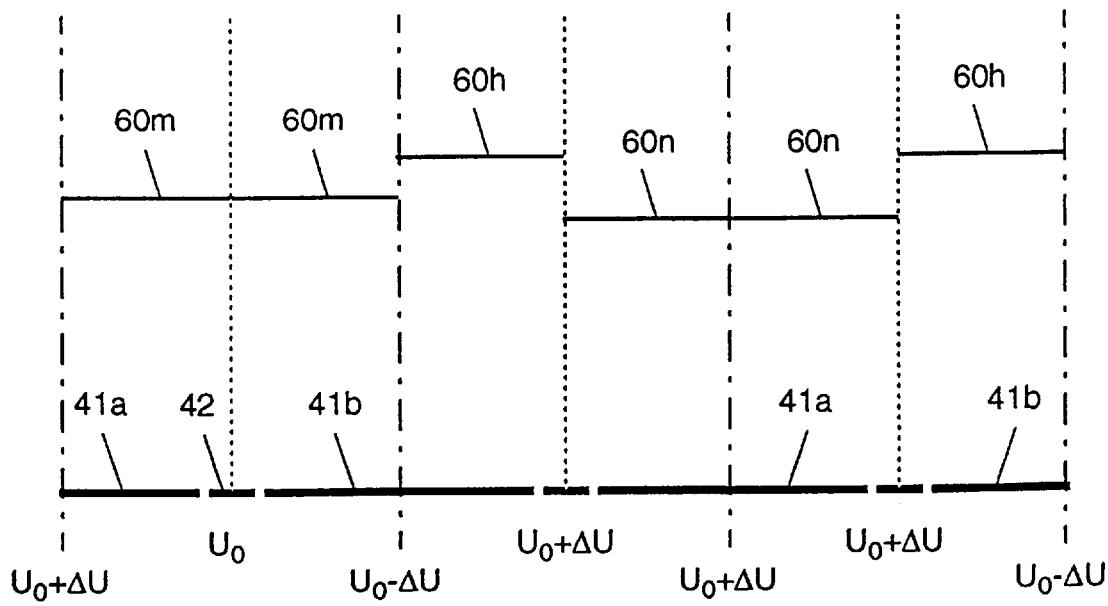

The mode of operation of a picture element according to the second embodiment of the present invention is illustrated in FIGS. 7a and 7b. FIGS. 7a and 7b schematically show a plurality of adjacent phase-modulating structures 34'. The potentials $U_0 + \Delta U$ and $U_0 - \Delta U$, respectively, applied to mirror electrode strips 41a, 41b as well as the control voltages $U_0$, $U_0 - \Delta U$ and $U_0 - \Delta U$, respectively, applied to the control electrodes 42 are indicated in the lower region of FIGS. 7a and 7b. It is basically possible to apply all voltages between $U_0 - \Delta U$ and $U_0 + \Delta U$ to the electrodes 42 in optional manner. The individual phase-modulating structures 34', which each represent a picture element, again are defined by dot-and-dash lines. In FIG. 7a, electric field lines 58 occurring with the voltage conditions mentioned are shown in the two phase-modulating structures 34' on the left-hand side.

In the phase-modulating structure 34' to the very left in FIG. 7a, all three electrodes 41a, 42, 41b are at different potentials, with the potential of control electrode 42 being between the potentials of the two mirror electrode strips 41a, 41b. The voltage difference between control electrode 42 and the two mirror electrode strips 41a, 41b is $\Delta U$ each. Above the electrodes of phase-modulating structure 34' to the very left in FIG. 7a, the resulting liquid level is indicated schematically. As the voltage difference on both sides of control electrode 42 is $\Delta U$, a medium liquid level 60 $m$ results in this picture element. It is apparent to experts that the representation of the liquid levels is schematic. In reality, the abruptly drawn liquid transitions pass from one level to the next one in a continuous manner.

In the phase-modulating structure 34' shown in the middle of FIG. 7a, to the right of just described phase-modulating structure 34', no voltage difference is present between mirror electrode strip 41b and control electrode 42, since they are both at the same potential $U_0 - \Delta U$. However, since a voltage difference of $2\Delta U$ arises between mirror electrode strip 41a and control electrode 42, all electric field lines 58 enter the left half of mirror electrode 41a, resulting in a high liquid level 60$h$ in the region between control electrode 42 and mirror electrode strip 41a. As there is no voltage difference present between mirror electrode strip 41b and control electrode 42, there is no effect on the level of liquid dielectric 36, and a low liquid level 60$n$ results again.

The phase-modulating structure 34' to the very right in FIG. 7a illustrates the case in which the control voltage is $U_0 + \Delta U$. The distribution of the electric field 58, not shown here any more, is analogous to the case just described, which is reflected by liquid levels 60$n$ and 60$h$.

For illustrating switching over of the control voltage with the voltage swing $2\Delta U$, the three adjacent phase-modulating structures just described are shown once more in FIG. 7b, with the voltage conditions, in comparison with FIG. 7a, being unchanged in the left-hand and right-hand phase-modulating structures, whereas the control voltage of the phase-modulating structure in the middle of FIG. 7b has been switched over from $U_0 - \Delta U$ to $U_0 + \Delta U$. As a reaction to switching over of the control voltage by the voltage swing $2\Delta U$, the liquid levels above the phase-modulating structure in the middle have reversed in accordance with the new voltage differences between control electrode 42 and mirror electrode strips 41a, 41b.

The liquid levels of the other phase-modulating structures, however, are substantially unaffected by this reversal. However, it is pointed out that applying of a control voltage $U_0$ effects a substantially uniform liquid level in the corresponding picture element. This state corresponds to the non-addressed state which in the first embodiment is characterized by a control voltage $U_S$ of 0 volt. However, when a control voltage different from control voltage $U_0$ is applied to control electrode 42, an approximately stepped liquid level 60$h$, 60$n$ results in the corresponding picture element, which in comparison with the approximately plane liquid level 60$m$, 60$m$ results in a phase modulation of the light 32 incident upon the corresponding phase-modulating structure 34'.

The phase profile can be adjusted or optimized via the detailed design of the electrode surfaces or the electrode topography, for example with peaks similar to pins 50 of the first embodiment, and by the detailed design of surface properties, for example the wettability, and of the parameters of the liquid.

The phase modulation in the second embodiment of the present invention is proportional to $U_0 \times U_S/d^2$. The effect achieved in embodiment 2 is that the liquid dielectric 36 moves only within the individual picture elements to be switched and thus is dependent only on the phase profile desired in addressing a picture element. In addition to gravity, resetting of the picture elements furthermore is effected in advantageous manner by the electric force effect similar to the addressing operation.

Figure 9:
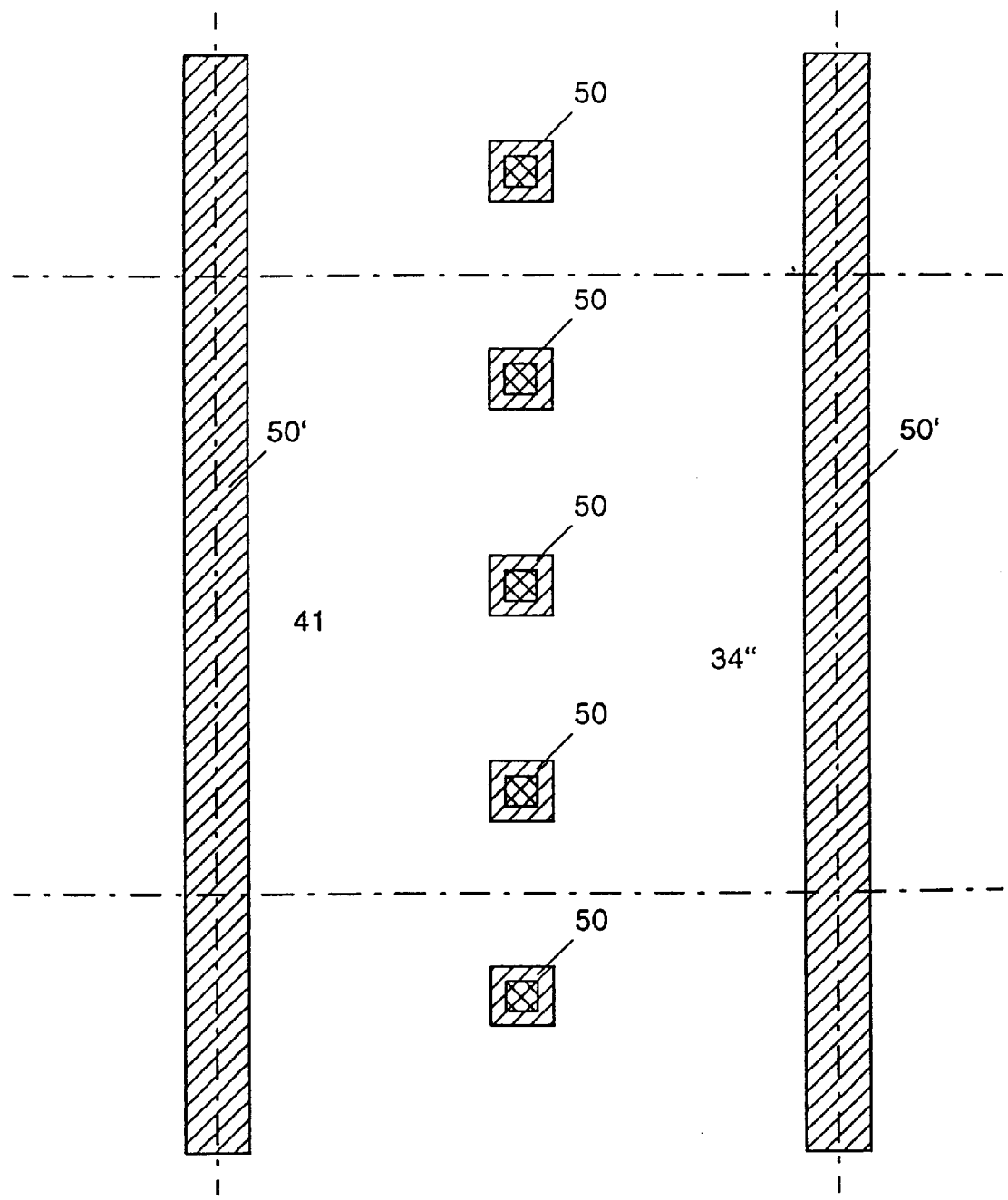
FIG. 9 shows a plan view of an array of phase-modulating structures according to a third embodiment of the present invention.
Figure 10:
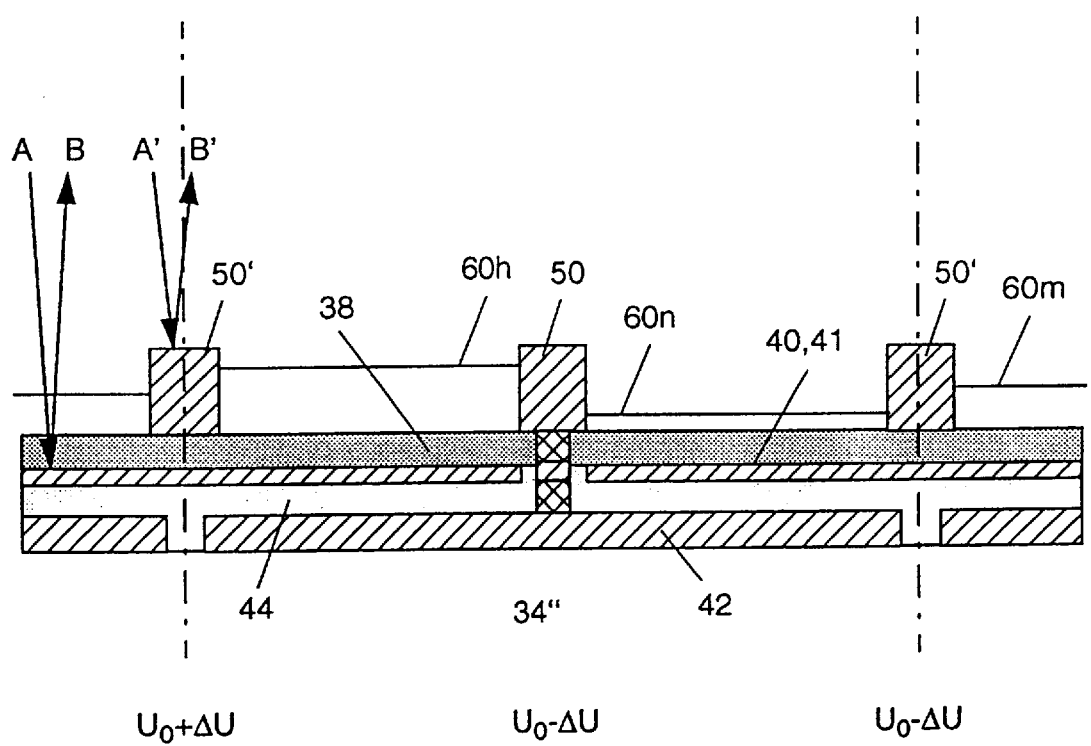
FIG. 10 shows a cross-sectional view of the array of phase-modulating structures of FIG. 9.

FIGS. 9 and 10 show a third embodiment of the invention in a top plan view and a cross-section, respectively. As can be seen in FIG. 9, the third embodiment in a certain way is a combination of the first embodiment (FIG. 3) and the second embodiment (FIG. 5). In accordance with the first embodiment, individual control electrodes 42 with suitably connected pins 50 of tungsten are provided, with the pins extending through holes in mirror electrode 41 and mirror 40 which constitutes the surface of mirror electrode 41. Differently from the first embodiment, additional reference electrodes 50' are formed in continuous manner at the vertical broken lines in FIG. 1. Reference electrodes 50' consist of conductive strips, for example of aluminum or a different suitable material, as can be seen in particular in FIG. 10. A pixel 34" is defined by the dot-and-dash lines in FIGS. 9 and 10. As can be seen in FIG. 10, the three pins 50 project beyond the maximum liquid level 60$h$. Their dimensions, furthermore, are selected such that they cover their respective hole 52. It is, however, apparent to experts that the dimensions and numbers of the pins 50, 50' are not essential to the invention and that these may also be varied.

For obtaining a variation of the liquid levels from one pixel 34" to an adjacent pixel 34", voltages $U_0+\Delta U$ and $U_0-\Delta U$, respectively, similar the second embodiment are applied to adjacent reference electrode strips 50', as shown in FIG. 10. Control voltages $U_S$ are applied to the control electrodes 42 in optional manner, with control voltage 42 in FIG. 10 having a voltage $U_0-\Delta U$ applied thereto which, due to the particular voltages at pins 50, causes the illustrated liquid levels 60$m$, 60$h$, 60$n$. Mirror electrodes 40 are at a further, fixed or controllable reference potential, which may be for example ground potential or the potential $U_0$ or another potential that is advantageous for optimizing the adjustment of the surface of dielectric 36.

The third embodiment described is suitable for light modulators in which an application of different voltages to the mirror electrodes is not desired, which holds also for the first embodiment. The third embodiment, however, displays the advantages described in connection with the second embodiment, namely increased liquid level variation due to differential addressing as well as improved resetting of the liquid in a pixel reversal. The pixel structure shown thus is suitable for obtaining good to maximum phase modulations in relation to a given voltage swing.

In order to minimize the effect of all electrodes 50, 50' as parasitic phase grating, the geometry of the picture element, via suitable adjustment of the layer thicknesses of pin 50 and strip 50' respectively, of the liquid level in the non-addressed state 60$m$ and of the dielectric 38, can be selected such that the light upon incidence and reflection on mirror 40 and on metal electrodes 50, 50', respectively, is subject to virtually the same phase shift in the non-addressed state of the picture element. Moreover, the influence of parasitic phase gratings can be suppressed in that the direction of diffraction chosen for image formation is selected differently from the direction caused by parasitic effects. It is obvious to experts that similar measures with similar effects can also be performed in embodiments 1 and 2.

All features of the light modulators, with the exception of the liquid, can be produced by conventional methods of semiconductor technology or by more recent and improved methods. As regards the liquid dielectric 36, the following parameters are of importance, among others: density, optical transparency, electric breakdown strength, dielectric constant, refractive index, temperature resistance, viscosity, light resistance, surface tension and vapor pressure.

As a protection against contamination, damage or evaporation of the liquid, the spatial light modulator 30 according to the first embodiment and the strip-type spatial light modulator 56 according to the second embodiment can be sealed and closed using an optically transparent window, such as e.g. a quartz plate.

Figure 8:
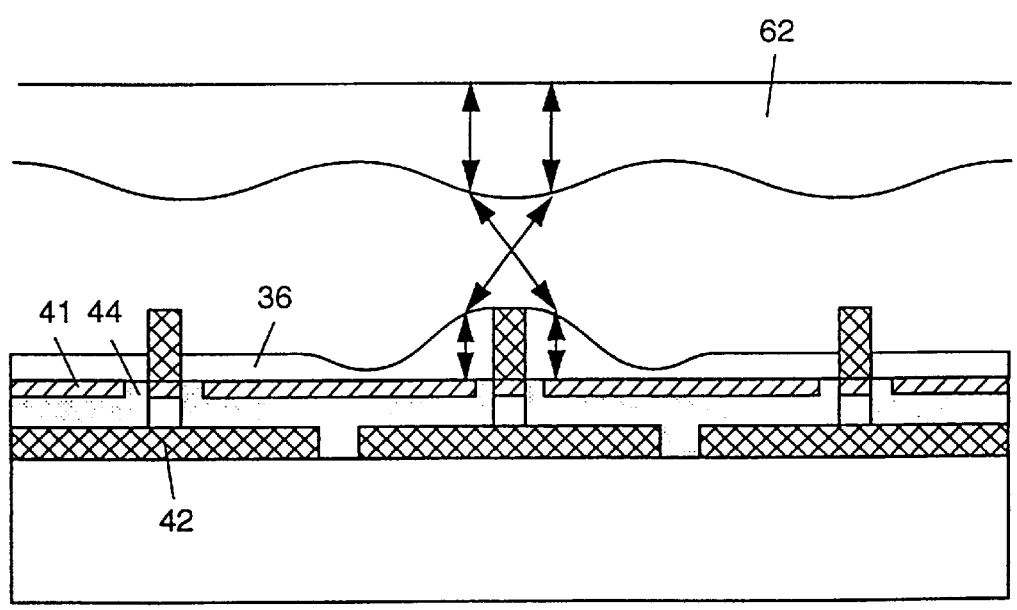
FIG. 8 schematically illustrates the effect of a correction lens arrangement arranged above the array of phase-modulating structures.

It may be advantageous for optical correction of the phase profile, for example in the non-addressed state, to arrange an optical correction member 62, as shown in FIG. 8, in front of spatial light modulator 30 or 56, respectively, in order to avoid e.g. undesired phase modulations or to reduce the effects of optically parasitic or inactive domains. To this end it is necessary that the suitable optical correction member 62, which has the required regularity necessitated by the picture element arrangement, be positioned exactly above the picture element plane. FIG. 8 shows how a lens-like pre-deformation of the surface of the liquid dielectric 36, which is present for example due to the capillarity or the surface tension of liquid dielectric 36, can be balanced by the optical correction member 62, which for example is a correction lens. The correction lenses could be manufactured, for example, mircrotechnically from a glass substrate and be applied using the anodic bonding technique.

Figure 11:
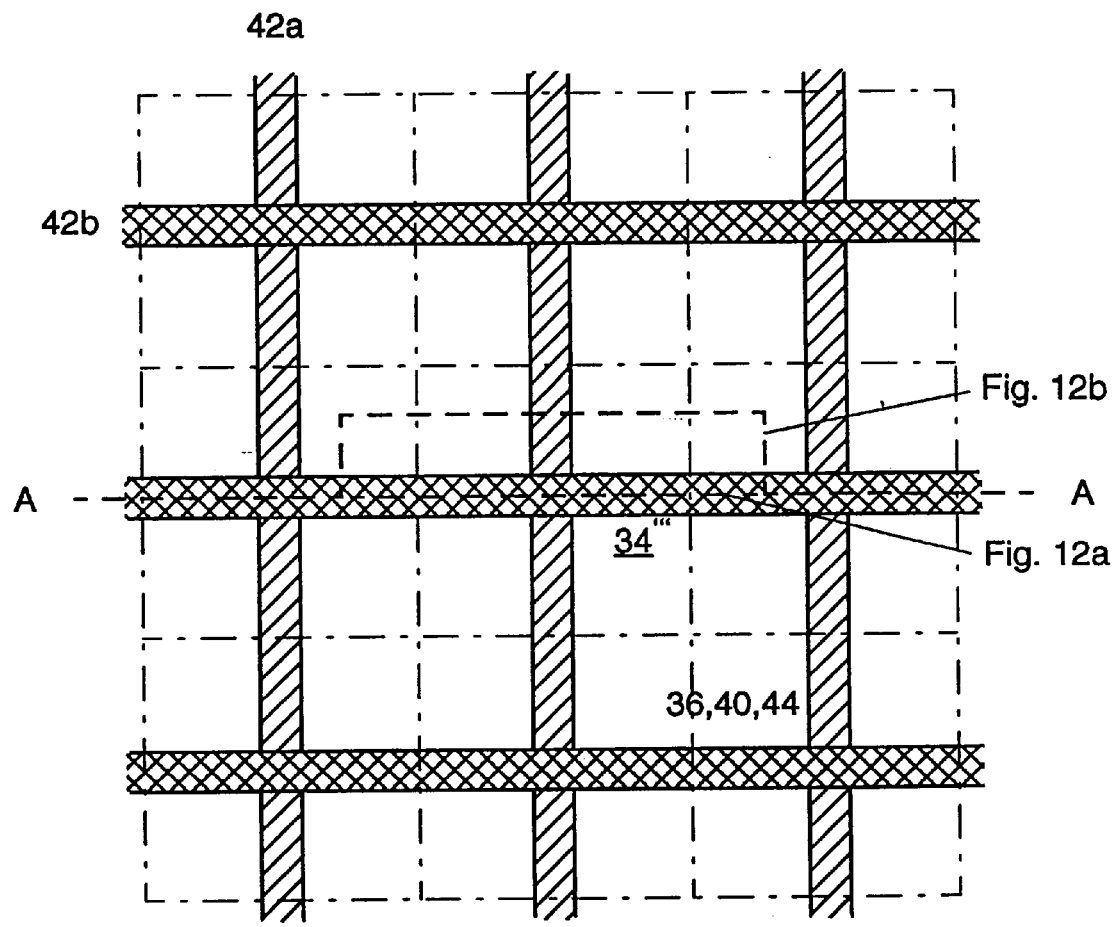
FIG. 11 shows a plan view of an array of phase-modulating structures according to a fourth embodiment of the present invention.

FIG. 11 shows an array of phase-modulating structures according to a fourth embodiment of the present invention. FIG. 12$a$ shows a cross-section of the array of FIG. 11 along the line designated 12$a$ in FIG. 11. Analogously therewith, FIG. 12$b$ shows a cross-section along the line designated FIG. 12$b$ in FIG. 11. FIG. 11 shows the two electrodes 42$a$, 42$b$ in a strip-shaped and mutually crossing configuration, i.e. in a grid pattern. The broken lines again depict a single phase-modulating structure corresponding to a pixel. In the embodiment shown, electrodes 42$a$ and 42$b$ intersect approximately in the center of a pixel, with an electric field in the vicinity of the crossing point being formed in this region by applying different potentials to the two electrodes. The dielectric 36 located in the vicinity of the crossing point thus constitutes the partial region of the dielectric in which the electrodes, which may have a voltage applied thereto, will generate an electric field. Reference numeral 34''' consequently depicts a pixel or phase-modulating structure according to the fourth embodiment of the present invention.

As shown in FIG. 12$a$, the deformable and transparent dielectric, which preferably is a liquid dielectric, covers strip-shaped electrode 42$b$ which in a preferred embodiment extends over strip-shaped electrode 42$a$ embedded in a solid dielectric. It is apparent to experts that horizontal electrode 42$b$ may also be embedded in the dielectric and that, accordingly, the vertical electrodes 42$a$ (FIG. 11) are covered by the liquid dielectric. It is also apparent that the liquid dielectric does not necessarily have to cover electrode 42$b$, but that the liquid dielectric may have a lower level than the height of the electrodes. The entire structure is confined in downward direction by mirror 40 on which the light incident upon the structure is reflected in order to again leave the structure through solid dielectric 44 and liquid dielectric 36. It is apparent that the solid dielectric 44 has to be transparent.

Figure 12A:
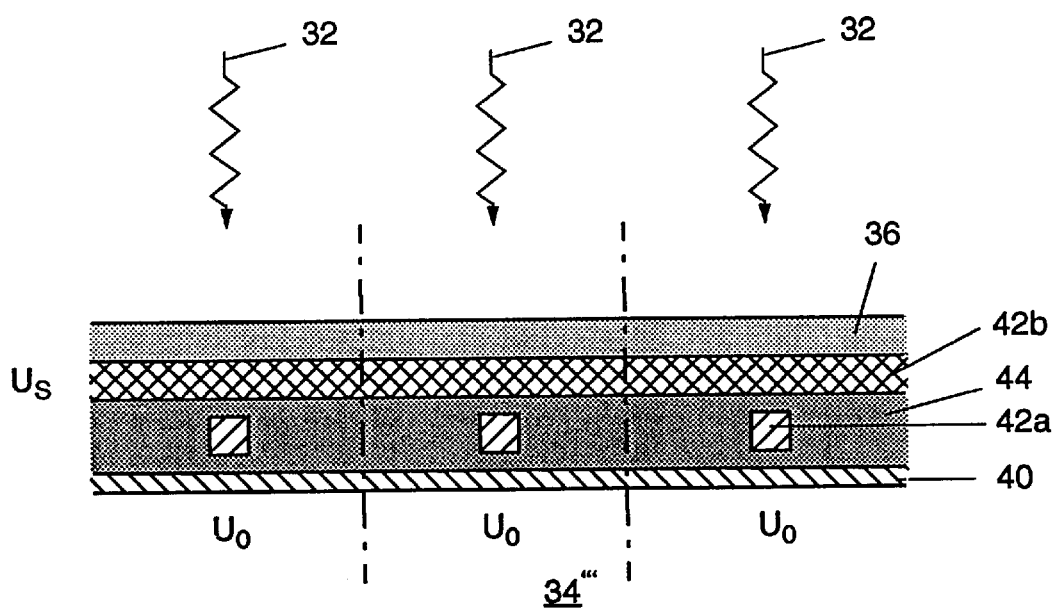
FIG. 12a shows a sectional view of the array of FIG. 11.
Figure 12B:
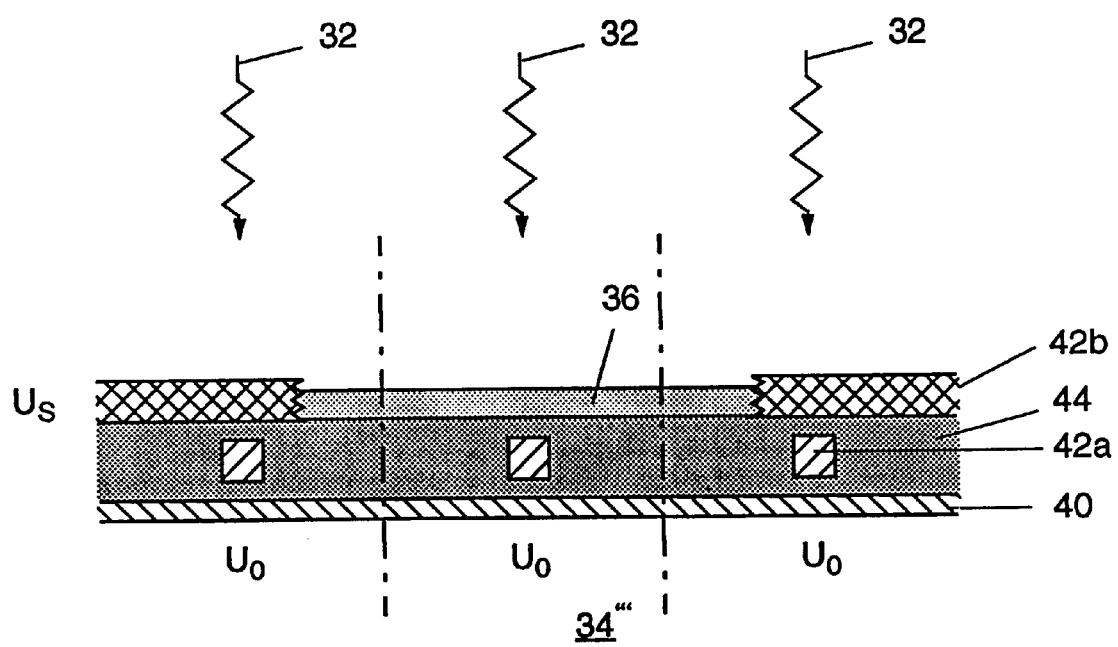
FIG. 12b shows a further sectional view of the array of FIG. 11.

FIG. 12$b$ shows another cross-section through the structure of FIG. 11, with the electrode 42$b$, however, being partly cut out for reasons of clarity, in order to make clear how light 32 incident upon the structure passes through liquid dielectric 36 as well as solid dielectric 44 so as to be reflected on mirror 40. Analogously to the figures described hereinbefore, the voltages applied to the electrodes are indicated symbolically. Each electrode 42a has a voltage $U_O$ applied thereto, while each electrode 42b has a voltage $U_S$ applied thereto. FIGS. 12a and 12b show a state in which the voltage $U_S$ applied is zero, i.e. the surface of liquid dielectric 36 is level. In case of an applied voltage $U_S$, a pattern of the surface of the liquid dielectric analogous to FIG. 4 would result, i.e. in the vicinity of the crossing points of the respective strip-shaped electrodes there will be present an increased liquid level. All other elements indicated in FIGS. 11, 12a and 12b correspond to the elements with the same reference numerals that have already been described in detail hereinbefore.

In addition to the already mentioned field of application of the spatial light modulators according to the present invention for wafer direct exposure, the spatial light modulators according to the present invention may be employed for a multiplicity of other applications, such as e.g. projection displays, holographic displays, programmable lenses, gratings, optical correlators and computers as well as head-up displays. Optical transparency refers to the transparency to the light used, with the wavelength thereof being not limited to the visible range. Depending on the application, infrared or ultraviolet light may be used as well.

What is claimed is:

1. A structure for the phase modulation of light incident upon said structure, comprising:
    a mirror;
    a deformable and transparent liquid dielectric disposed on the mirror; and
    at least two electrodes adapted to have a voltage applied thereto for generating an electric field in at least a partial region of said dielectric, thereby changing the optical path length of the light passing through the dielectric with respect to a state of the dielectric in which the electric field is not applied thereto,
    wherein said dielectric with respect to the electrodes is disposed such that the light passing through the dielectric passes at least through part of said partial region of the dielectric adapted to have the electric field applied thereto, before it impinges upon one of the electrodes; and
    wherein said dielectric, said mirror and said electrodes are arranged on a substrate having a CMOS active matrix through which a voltage can be applied to said electrodes.

2. The structure of claim 1, wherein the deformable, transparent dielectric is of layer-type.

3. The structure of claim 2, wherein the layer-type dielectric is arranged parallel to the mirror.

4. The structure of claim 3, wherein one electrode and the mirror have a hole in which at least part of the other electrode is located, the electrodes being electrically isolated from each other by said dielectric.

5. The structure of claim 4, wherein said part of the other electrode extends through the hole beyond said one electrode and through said dielectric.

6. The structure of claim 4, wherein between said one electrode and said other electrode there is disposed a solid dielectric which together with the two electrodes constitutes a buffer capacitor.

7. The structure of claim 4, wherein said hole is a continuous hole so that mutually isolated mirror electrode strips are formed.

8. A spatial light modulator comprising:
    a plurality of like or different structures arranged in an array, each structure comprising: a mirror; a deformable and transparent dielectric disposed on the mirror; and at least two electrodes adapted to have a voltage applied thereto for generating a electric field in at least the partial region of said dielectric, thereby changing the optical path length of the light passing through the dielectric with respect to a state of the dielectric in which the electric field is not applied thereto, wherein said dielectric with respect to the electrodes is disposed such that the light passing through the dielectric passes at least through part of said partial region of the dielectric adapted to have the electric field applied thereto, before it impinges upon one of the electrodes; and wherein said dielectric, said mirror and said electrodes are arranged on a substrate having a CMOS active matrix through which you voltage can be applied to said electrodes.

9. The spatial light modulator of claim 8, wherein a plurality of like or different structures is arranged in arbitrary manner on a surface, wherein each structure further comprises the following features:
    the deformable, transparent dielectric is of layer-type;
    the layer-type dielectric is arranged parallel to the mirror;
    one electrode and the mirror have a hole in which at least part of the other electrode is located, the electrodes being electrically isolated from each other by said dielectric; and
    between said one electrode and said other electrode there is disposed a solid dielectric which together with the two electrodes constitutes a buffer capacitor.

10. The spatial light modulator of claim 8, wherein the other electrodes of the plurality of structures are electrically isolated from each other.

11. The spatial light modulator of claim 8, wherein said one electrodes and said mirrors of the structures are of continuous design.

12. The spatial light modulator of claim 9, wherein said one electrodes and said mirrors of the plurality of structures are of continuous design in only one array direction and are separated by elongated holes in the other array direction.

13. The spatial light modulator of claim 11, wherein the mirror electrode strips have voltages applied thereto in alternating manner which are symmetric with respect to a reference value.

14. The spatial light modulator of claim 8, wherein at at least two boundaries of a pixel there are formed continuous electrode strips, with adjacent electrode strips having different voltages applied thereto.

15. The spatial light modulator of claim 8, wherein a transparent protective window is provided over the plurality of structures.

16. The spatial light modulator of claim 8, wherein an optical correction member is provided over the plurality of structures.

17. The spatial light modulator of claim 8, wherein the thickness of pins, extending through holes in the electrodes and the mirror, and the electrodes, the liquid level in the non-addressed state and/or the thickness of the dielectric are adjusted such that the effect of parasitic structures is minimized.

18. The spatial light modulator of claim 8, wherein two sets of strip-shaped electrodes each are arranged in a grid pattern, with one set of parallel electrodes being electrically isolated from the other set of parallel electrodes through a solid dielectric.

19. The structure of claim 1, wherein the mirror is constituted by a surface of an electrode on which the light is incident.

20. The structure of claim 1, wherein the deformable, transparent dielectric is a liquid dielectric.

21. A structure for the phase modulation of light incident upon said structure, comprising:
- a mirror;
- a deformable and transparent layer-type dielectric disposed on the mirror and arranged parallel to the mirror; and
- least two electrodes adapted to have a voltage applied thereto for generating an electric field in at least a partial region of said dielectric, thereby changing the optical path length of the light passing through the dielectric with respect to a state of the dielectric in which the electric field is not applied thereto,
- wherein said dielectric with respect to the electrodes is disposed such that the light passing through the dielectric passes at least through part of said partial region of the dielectric adapted to have the electric field applied thereto, before it impinges upon one of the electrodes;
- wherein said dielectric, said mirror and said electrodes are arranged on a substrate having a CMOS active matrix through which a voltage can be applied to said electrodes; and
- wherein one electrode and the mirror have a hole in which at least part of the other electrode is located, the electrodes being electrically isolated from each other by said dielectric.

22. The structure of claim 21, wherein said part of the other electrode extends through the whole beyond said one electrode and through said dielectric.

23. The structure of claim 21, wherein between said one electrode and said other electrode there is disposed a solid dielectric which together with the two electrodes constitutes a buffer capacitor.

24. The structure of claim 21, wherein said hole is a continuous hole so that mutually isolated mirror electrode strips are formed.

25. A spatial light modulator comprising:
- a plurality of like or different structures arranged in an array, each structure comprising:
  - a mirror;
  - a deformable and transparent layer-type dielectric disposed on the mirror and arranged parallel to the mirror; and
  - at least two electrodes adapted to have a voltage applied thereto for generating an electric field in at least a partial region of said dielectric, thereby changing the optical path length of the light passing through the dielectric with respect to a state of the dielectric in which the electric field is not applied thereto,
  - wherein said dielectric with respect to the electrodes is disposed such that the light passing through the dielectric passes at least through part of said partial region of the dielectric adapted to have the electric field applied thereto, before it impinges upon one of the electrodes; and wherein said dielectric, said mirror and said electrodes are arranged on a substrate having a CMOS active matrix through which a voltage can be applied to said electrodes, and
  - wherein one electrode and the mirror have a hole in which at least part of the other electrode is located, the electrodes being electrically isolated from each other by said dielectric; and
  - between said one electrode and said other electrode there is disposed a solid dielectric which together with the two electrodes constitutes a buffer capacitor.

26. The spatial light modulator of claim 25, wherein said one electrodes and said mirrors of the plurality of structures are of continuous design in only one array direction and are separated by elongated holes in the other array direction.

27. A spatial light modulater comprising:
- a plurality of like or different structures arranged in an array, each structure comprising:
  - a mirror;
  - a deformable and transparent dielectric disposed on the mirror; and
  - at least two electrodes adapted to have a voltage applied thereto for generating an electric field in at least a partial region of said dielectric, thereby changing the optical path length of the light passing through the dielectric with respect to a state of the dielectric in which the electric field is not applied thereto, wherein said dielectric with respect to the electrodes is disposed such that the light passing through the dielectric passes at least through part of said partial region of the dielectric adapted to have the electric field applied thereto, before it in impinges upon one of the electrodes; and wherein said dielectric, said mirror and said electrodes are arranged on a substrate having a CMOS active matrix through which you voltage can be applied to said electrodes and wherein at least two boundaries of a pixel there are formed continuous electrode strips, with adjacent electrode strips having different voltages applied thereto.

28. A spatial light modulater comprising:
- a plurality of like or different structures arranged in an array, each structure comprising:
  - a mirror;
  - a deformable and transparent dielectric disposed on the mirror; and
  - at least two electrodes adapted to have a voltage applied thereto for generating an electric field in at least a partial region of said dielectric, thereby changing the optical path length of the light passing through the dielectric with respect to a state of the dielectric in which the electric field is not applied thereto, wherein said dielectric with respect to the electrodes is disposed such that the light passing through the dielectric passes at least through part of said partial region of the dielectric adapted to have the electric field applied thereto, before it in impinges upon one of the electrodes; and wherein said dielectric, said mirror and said electrodes are arranged on a substrate having a CMOS active matrix through which a voltage can be applied to said electrodes and wherein an optical correction member is provided over the plurality of structures.

29. A spatial light modulater comprising:
- a plurality of like or different structures arranged in an array, each structure comprising:
  - a mirror;
  - a deformable and transparent dielectric disposed on the mirror; and
  - at least two electrodes adapted to have a voltage applied thereto for generating an electric field in at least a partial region of said dielectric, thereby changing the optical path length of the light passing through the dielectric with respect to a state of the dielectric in which the electric field is not applied thereto, wherein said dielectric with respect to the electrodes is disposed such that the light passing through the dielectric passes at least through part of said partial region of the dielectric adapted to have the electric field applied thereto, before it in impinges upon one of the electrodes; and wherein said dielectric, said mirror and said electrodes are arranged on a substrate having a CMOS active matrix through which a voltage can be applied to said electrodes and wherein a transparent protective window is provided over the plurality of structures.

30. A spatial light modulater comprising:

a plurality of like or different structures arranged in an array, each structure comprising:

a mirror;

a deformable and transparent dielectric disposed on the mirror; and at least two electrodes adapted to have a voltage applied thereto for generating an electric field in at least a partial region of said dielectric, thereby changing the optical path length of the light passing through the dielectric with respect to a state of the dielectric in which the electric field is not applied thereto, wherein said dielectric with respect to the electrodes is disposed such that the light passing through the dielectric passes at least through part of said partial region of the dielectric adapted to have the electric field applied thereto, before it in impinges upon one of the electrodes; and wherein said dielectric, said mirror and said electrodes are arranged on a substrate having a CMOS active matrix through which a voltage can be applied to said electrodes and wherein the thickness of pins, extending through holes in the electrodes and the mirror, and the electrodes, the liquid level in a non-addressed state and/or the thickness of the dielectric are adjusted such that the effect of parasitic structures is minimized.

* * * * *